United States Patent
Lee et al.

(10) Patent No.: US 10,794,299 B2
(45) Date of Patent: Oct. 6, 2020

(54) VARIABLE EXHAUST VALVE ASSEMBLY FOR VEHICLE

(71) Applicants: Hyundai Motor Company, Seoul (KR); Kia Motors Corporation, Seoul (KR); Sejong Ind. Co., Ltd., Ulsan (KR)

(72) Inventors: Sang Il Lee, Gyeonggi-do (KR); Yun Soo Kim, Incheon (KR); Wan Cheol Lee, Incheon (KR); Jin Woo Kim, Gyeonggi-do (KR); Jong Hwa Kang, Ulsan (KR)

(73) Assignees: Hyundai Motor Company, Seoul (KR); Kia Motors Corporation, Seoul (KR); Sejong Ind. Co., Ltd., Ulsan (KR)

( * ) Notice: Subject to any disclaimer, the term of this patent is extended or adjusted under 35 U.S.C. 154(b) by 21 days.

(21) Appl. No.: 16/217,583

(22) Filed: Dec. 12, 2018

(65) Prior Publication Data

US 2020/0049079 A1 Feb. 13, 2020

(30) Foreign Application Priority Data

Aug. 13, 2018 (KR) .................. 10-2018-0094310

(51) Int. Cl.
*F02D 9/10* (2006.01)
*F16K 27/02* (2006.01)
(Continued)

(52) U.S. Cl.
CPC ........... *F02D 9/1065* (2013.01); *F01N 13/14* (2013.01); *F01N 13/1811* (2013.01); *F02D 9/04* (2013.01);
(Continued)

(58) Field of Classification Search
CPC .......... F16K 1/22; F16K 1/224; F16K 1/2268; F16K 27/0218; F16K 31/041;
(Continued)

(56) References Cited

U.S. PATENT DOCUMENTS 5,630,571 A * 5/1997 Kipp ..................... F02D 9/06 251/214
7,401,592 B2 * 7/2008 Willats .................. F01N 13/08 123/323
(Continued)

FOREIGN PATENT DOCUMENTS

KR 2013-0013999 A 2/2013

*Primary Examiner* — Matthew W Jellett
(74) *Attorney, Agent, or Firm* — Mintz Levin Cohn Ferris Glovsky and Popeo, P.C.; Peter F. Corless

(57) ABSTRACT

A variable exhaust valve assembly for a vehicle includes an exhaust housing, a power transmission device that transmits rotational power, a shaft that extends through the exhaust housing and is coupled with a valve so as to open and close the exhaust housing, and a heat shielding unit to reduce heat transfer between the power transmission device and the exhaust housing. The power transmission device is configured to regulate an opening degree of the valve. The variable exhaust valve assembly is improved in durability by minimizing damage to power transmission caused by high-temperature heat of exhaust gas, and reducing vibration transmitted to the power transmission device.

8 Claims, 7 Drawing Sheets

(51) Int. Cl.
| | |
|---|---|
| *F16K 49/00* | (2006.01) |
| *F01N 13/18* | (2010.01) |
| *F02D 9/04* | (2006.01) |
| *F01N 13/14* | (2010.01) |
| *F16K 31/04* | (2006.01) |
| *F16K 1/22* | (2006.01) |
| *F16K 1/226* | (2006.01) |
| *F02M 26/54* | (2016.01) |
| *F02M 26/70* | (2016.01) |
| *F02M 26/73* | (2016.01) |
| *F02M 26/74* | (2016.01) |
| *F02M 26/16* | (2016.01) |
| *F02M 26/67* | (2016.01) |

(52) U.S. Cl.
CPC ............ *F02M 26/16* (2016.02); *F02M 26/54* (2016.02); *F02M 26/70* (2016.02); *F02M 26/73* (2016.02); *F02M 26/74* (2016.02); *F16K 1/22* (2013.01); *F16K 1/224* (2013.01); *F16K 1/2268* (2013.01); *F16K 27/0218* (2013.01); *F16K 31/041* (2013.01); *F16K 31/042* (2013.01); *F16K 31/043* (2013.01); *F16K 31/045* (2013.01); *F16K 49/00* (2013.01); *F01N 2510/02* (2013.01); *F02M 26/67* (2016.02)

(58) Field of Classification Search
CPC .... F16K 31/042; F16K 31/043; F16K 31/045; F16K 49/00; F02M 26/16; F02M 26/54; F02M 26/67; F02M 26/70; F02M 26/73; F02M 26/74; F02D 9/1065; F01N 13/1811
USPC ............ 251/129.11, 129.12, 249.5, 305, 306
See application file for complete search history.

(56) References Cited

U.S. PATENT DOCUMENTS

| | | | |
|---|---|---|---|
| 7,536,990 B2 * | 5/2009 | Willats | F02D 9/04 123/323 |
| 9,500,162 B2 * | 11/2016 | Sasaki | F16K 31/042 |
| 9,587,707 B2 * | 3/2017 | Takeda | F16D 3/68 |
| 10,060,360 B2 * | 8/2018 | Delplanque | F02M 26/67 |
| 10,167,785 B2 * | 1/2019 | Oblinger | F01N 1/18 |
| 10,450,969 B2 * | 10/2019 | Stark | F02M 26/70 |
| 10,508,741 B2 * | 12/2019 | Schmitt | F02D 9/1065 |
| 2010/0071435 A1 * | 3/2010 | Hatano | B21D 39/037 72/362 |
| 2017/0175925 A1 * | 6/2017 | Izumi | F16H 57/0025 |

* cited by examiner

VARIABLE EXHAUST VALVE ASSEMBLY FOR VEHICLE

CROSS-REFERENCE TO RELATED APPLICATION

This application claims under 35 U.S.C. § 119(a) the benefit of Korean Patent Application No. 10-2018-0094310, filed on Aug. 13, 2018 in the Korean Intellectual Property Office, the entire contents of which are incorporated herein by reference.

BACKGROUND

1. Technical Field

The present disclosure relates to a variable exhaust valve assembly for a vehicle that regulates the flow rate of exhaust gas.

2. Description of the Related Art

Exhaust gas generated after the combustion of fuel in an engine is guided to the outside of the engine through an exhaust manifold, and the exhaust gas is then introduced into a turbocharger so as to be recycled, or discharged to the outside of the vehicle through an exhaust device.

As the exhaust gas is discharged at a high speed, noise is generated. In order to reduce the noise generated, a muffler is mounted for lowering the flow rate of the exhaust gas and lowering the temperature of the exhaust gas.

In addition, in recent years, an exhaust valve has been provided on a path through which the exhaust gas is discharged in order to increase the driver's feeling of driving using the exhaust gas being discharged. Such an exhaust valve controls the discharge amount of the exhaust gas according to an opening degree thereof, and according to the opening degree of the exhaust valve, noise is lowered or transmitted so as to convey to the driver a sporty driving feeling.

However, an exhaust valve device known in the related art is driven by a motor, and there is a problem in that the motor is damaged as the high-temperature heat transferred from the exhaust gas is transmitted to the motor. In addition, there is a problem in that vibration generated due to movement of the vehicle and the circulation of exhaust gas is transmitted to the motor, thereby causing damage to the motor.

The matters described above as the background art are provided merely for the purpose of promoting an understanding of the background of the present disclosure, and the foregoing description of the background art should not be construed as admitting that the above-described matters correspond to the prior art, which has already been known to those skilled in the art.

SUMMARY

The present disclosure provides a variable exhaust valve assembly for a vehicle in which a motor device for regulating an opening degree of a valve is improved in durability by minimizing damage to the motor device, e.g., caused by high-temperature heat, and reducing vibration transmitted to the motor device.

In particular, the variable exhaust valve assembly according to the present disclosure includes: an exhaust housing through which exhaust gas flows; a power transmission device disposed apart from the exhaust housing and configured to transmit rotational power; a shaft configured to receive the rotational power from the power transmission device, extending through and across the exhaust housing, and coupled with a valve provided inside the exhaust housing so as to open and close the exhaust housing according to a rotational position thereof; and a heat shielding unit mounted on the shaft between the power transmission device and the exhaust housing and configured to block heat transfer so as to reduce heat transfer between the power transmission device and the exhaust housing.

The exhaust housing is provided with a through hole through which a shaft passes, and the heat shielding unit has a cover unit formed to cover a peripheral portion of the through hole in the exhaust housing in a state of being mounted on the shaft.

The variable exhaust valve assembly further includes a bearing member provided to close the through hole and configured to wrap the shaft so as to support rotary motion of the shaft.

The heat shielding unit includes an elastic member provided to be in contact with one end of the bearing member inside the cover unit and configured to press the bearing member toward the through hole, and the shaft is provided with a support protrusion which is located at a remaining end of the bearing member and protrudes in a circumferential direction such that the bearing member is seated on the support protrusion to be restricted from moving toward the exhaust housing.

The power transmission device is provided with a rotary shaft configured to transmit rotational power, the heat shielding unit is provided with a connection portion that extends from the cover unit and is coupled to the rotary shaft, and the connection portion is provided with a mounting groove, which is recessed such that the shaft is inserted thereinto.

The connection portion of the heat shielding unit is provided with a first opening hole, the shaft is provided with a second opening hole that corresponds to the first opening hole in a state where the shaft is inserted into the mounting groove in the connection portion, and a fastening pin is inserted into the first opening hole and the second opening hole such that the heat shielding unit and the shaft are connected to each other.

Any one of the first opening hole and the second opening hole is formed to have a larger size.

The heat shielding unit is provided with a heat insulating unit, which is installed in the connection portion to be located between the power transmission device and the cover unit and is configured to dissipate and radiate heat transmitted through the exhaust housing and the cover unit.

The rotary shaft is provided with an insertion protrusion or an insertion groove at an end portion corresponding to the connection portion, and the connection portion is provided with an insertion groove or an insertion protrusion, which is matched with the rotary shaft.

The power transmission device includes: a housing in which a motor unit configured to generate rotational power is housed; a rotary shaft provided inside the housing and configured to transmit the rotational power transmitted from the motor unit to the shaft; and a vibration absorption unit provided inside the housing and configured to rotationally support the rotary shaft from the housing and to absorb vibration.

The vibration absorption unit includes a worm wheel unit that is rotated by receiving rotational power from the motor unit, and a damper unit that is seated on the worm wheel unit and absorbs vibration, and the rotary shaft includes a shaft portion that penetrates the worm wheel unit and is configured to transmit rotational power to the shaft, and a support portion that protrudes from the shaft portion to be mounted on the worm wheel unit and to be seated on the damper unit.

The variable exhaust valve assembly of the vehicle having the above-described structure minimizes damage to a power transmission device for regulating the opening degree of the valve, which is caused by high-temperature heat of exhaust gas, and reduces vibration, which is transmitted to the power transmission device, thereby improving the durability of the power transmission device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a variable exhaust valve assembly for a vehicle according to an embodiment of the present disclosure will be described with reference to the accompanying drawings.

Figure 1:
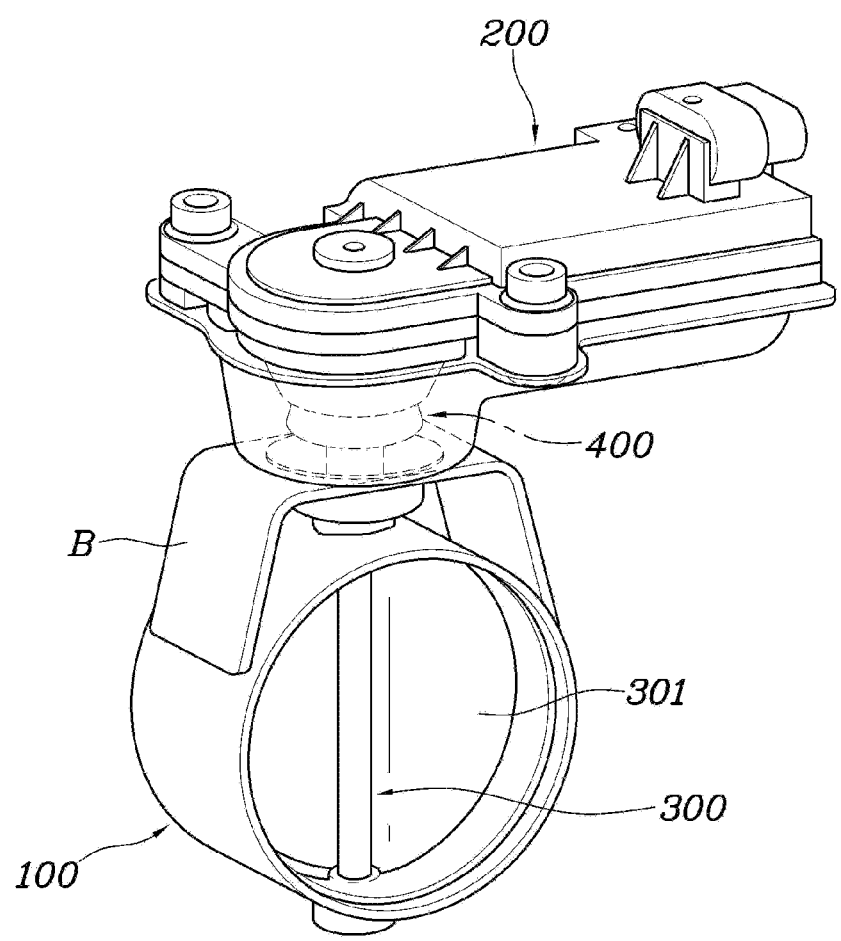
FIG. 1 is a perspective view of a variable exhaust valve assembly for a vehicle according to an embodiment of the present disclosure.
Figure 2:
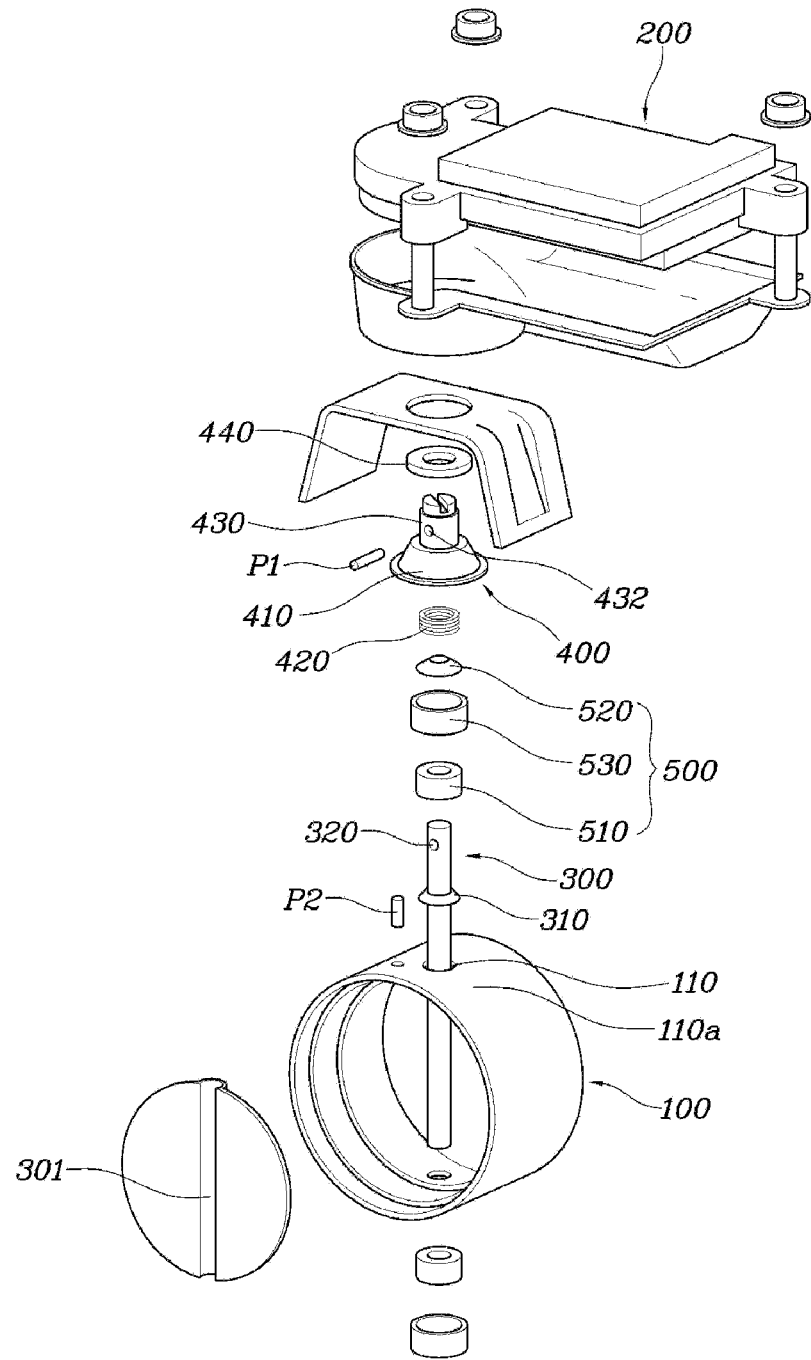
FIG. 2 is an exploded parts view of the variable exhaust valve assembly of FIG. 1.
Figure 3:
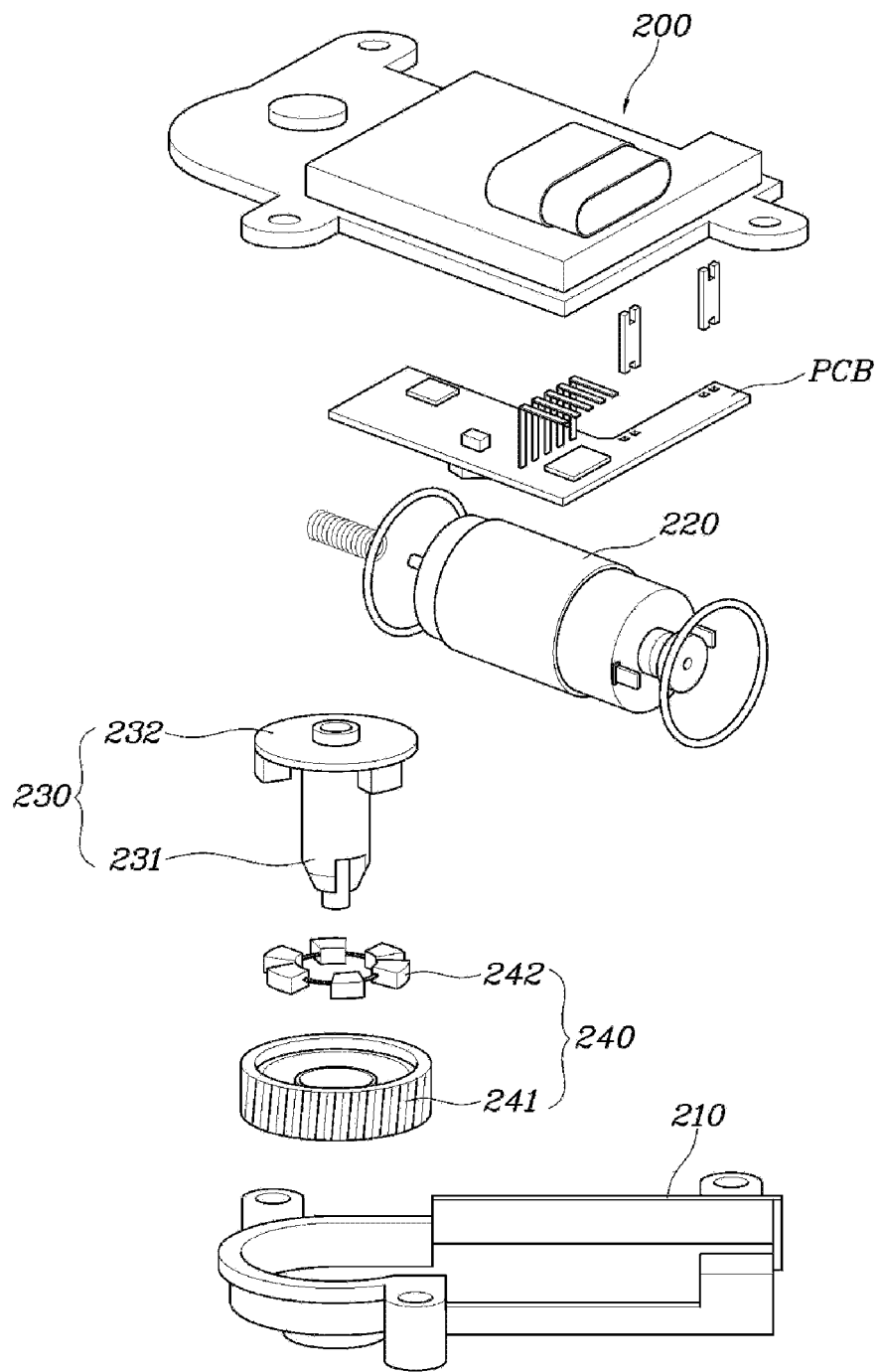
FIG. 3 is an exploded parts view of a power transmission device according to the variable exhaust valve assembly of the vehicle shown in FIG. 1.
Figure 4:
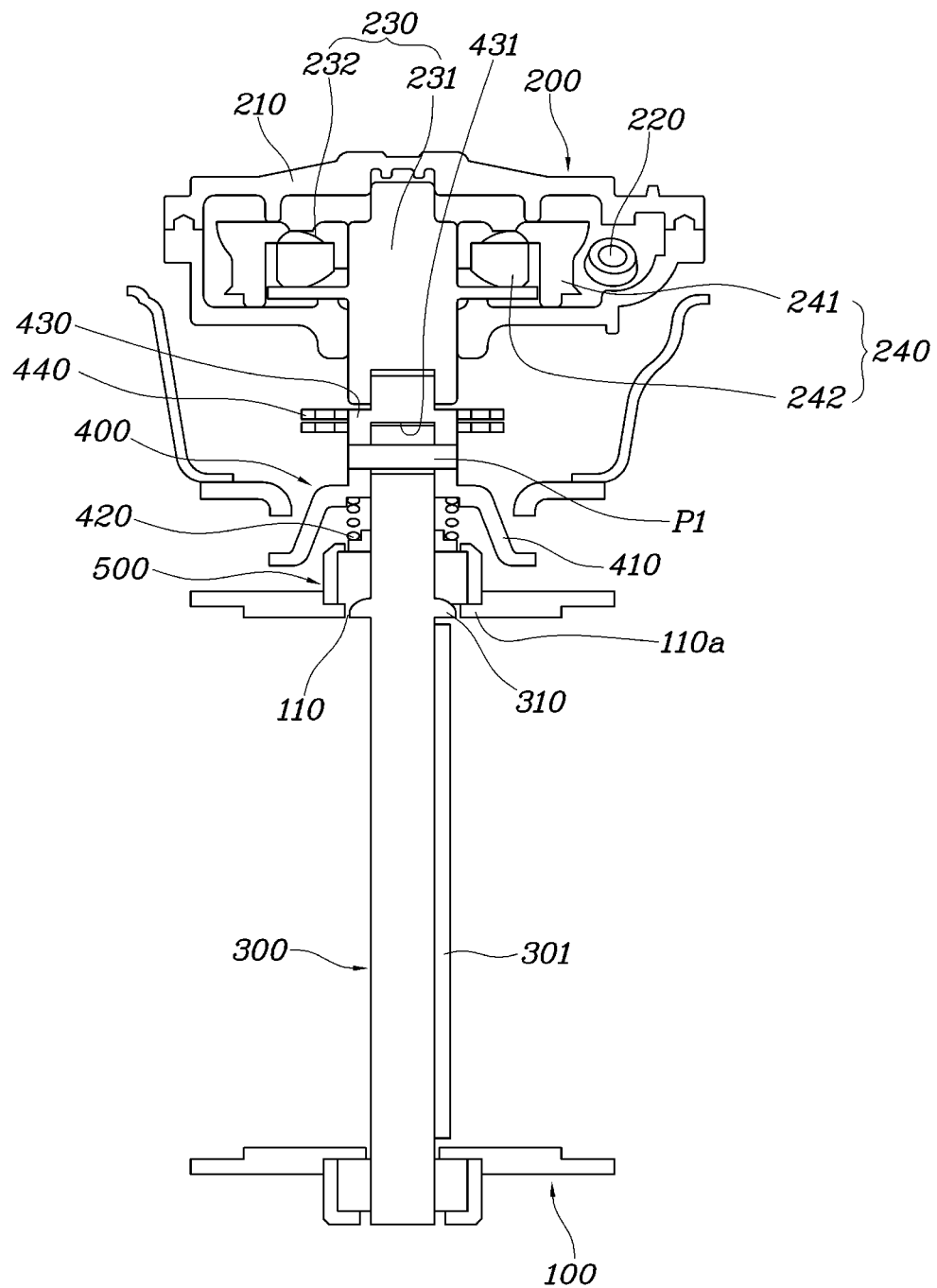
FIG. 4 is a cross-sectional view of the variable exhaust valve assembly shown in FIG. 1.

FIG. 1 is a perspective view of a variable exhaust valve assembly for a vehicle according to an embodiment of the present disclosure, FIG. 2 is an exploded parts view of the variable exhaust valve assembly of FIG. 1, and FIG. 3 is an exploded parts view of a power transmission device according to the variable exhaust valve assembly shown in FIG. 1. FIG. 4 is a cross-sectional view of the variable exhaust valve assembly shown in FIG. 1, and FIGS. 5 to 7 are views for explaining the variable exhaust valve assembly shown in FIG. 1.

As shown in FIGS. 1 and 2, the variable exhaust valve assembly for a vehicle according to the present disclosure includes: an exhaust housing 100 through which exhaust gas flows; a power transmission device 200 disposed apart from the exhaust housing 100 and configured to transmit rotational power; a shaft 300 configured to receive the rotational power from the power transmission device 200, extending through and across the exhaust housing 100, and coupled with a valve 301 provided inside the exhaust housing 100 to open and close the exhaust housing 100 according to a rotational position thereof; and a heat shielding unit 400 mounted on the shaft 300 between the power transmission device 200 and the exhaust housing 100 and configured to block heat transfer so as to reduce heat transfer between the power transmission device 200 and the exhaust housing 100.

Here, the exhaust housing 100 may be coupled to an end of the exhaust pipe inside a muffler, in which the exhaust housing is formed in a cylindrical shape and is configured to circulate exhaust gas therein. The shaft 300 configured to receive the rotational power from the power transmission device 200 vertically penetrates the exhaust housing 100, and a bearing may be installed in a portion where the shaft 300 vertically penetrates so as to rotatably support the shaft 300. In addition, since the shaft 300 is coupled with the valve 301 which is rotated together with the shaft 300 in the exhaust housing 100 to open and close the exhaust housing 100, the flow rate of the exhaust gas is determined depending on the opening degree of the valve 301, which is determined according to the rotational position of the valve 301. Here, in the case of the valve 301, the maximum opening degree of the valve 301 may be limited by a fixing pin P2 protruding to the inside of the exhaust housing 100.

Particularly, the shaft 300 is provided with the heat shielding unit 400 disposed between the power transmission device 200 and the exhaust housing 100 in order to reduce the heat transfer from the exhaust gas, which passes through the exhaust housing 100, to the power transmission device 200. That is, as the shaft 300 penetrates the exhaust housing 100, the heat of the exhaust gas is released to the penetrated portion of the exhaust housing 100. Since the heat shielding unit 400 prevents heat, which is released from the portion where the shaft 300 penetrates, from flowing to the power transmission device 200, whereby the power transmission device 200 is not damaged by high-temperature heat. As a result, the power transmission apparatus 200 is minimized in damage due to high-temperature heat, thereby being improved in durability.

The present disclosure will now be described in detail. As illustrated in FIGS. 2 and 4, the exhaust housing 100 may include a through hole 110 through which the shaft 300 passes, and the heat shielding unit 400 may have a cover unit 410 configured to cover the peripheral portion 110a of the through hole 110 in the exhaust housing 100 in the state of being mounted on the shaft 300.

In this way, the exhaust housing 100 is provided with the through hole 110 through which the shaft 300 passes. The through hole 110 is a passage through which the shaft 300 passes in the exhaust housing 100. The shaft 300 is illustrated as passing through both the upper and lower sides of the exhaust housing 100 in the vertical direction. However, it is possible to selectively form the through hole 110 only on the upper side or both the upper and lower sides. A bearing member 500 is provided in the through hole 110. When the through hole 110 is provided on both the upper and lower sides of the exhaust housing 100, the bearing member 500 may be provided on each of the upper and lower sides.

Here, the bearing member 500 may be provided so as to close the through hole 110, and may be configured to support the rotary motion of the shaft 300 by wrapping the shaft 300. The bearing member 500 may include a bearing 510 that wraps the shaft 300, a retainer 520 that is seated on the upper side of the bearing and supports an elastic member 420 to be described later, and a bearing cap 530 configured to wrap the bearing 510 and the retainer 520 and fixedly mounted in the through hole 110. Accordingly, the bearing member 500 can be fixed to the through hole 110, and the shaft 300 can be rotatably supported in the state of being fixed to the through hole 110.

Meanwhile, the heat shielding unit 400 is provided with the cover unit 410 formed to cover the through hole 110 in the exhaust housing 100 and the peripheral portion 110a of the through hole 110. The cover unit 410 may be formed in a cone shape and may be disposed apart from the exhaust housing 100 while covering the peripheral portion 110a of the through hole 110 together with the through hole 110 in the exhaust housing 100 in the state in which the cover unit 410 is mounted on the shaft 300. Thus, the heat discharged through the through hole 110 does not flow to the power transmission device 200 side by the cover unit 410 and the path of the heat is switched to a portion separated from the exhaust housing 100, so that the heat can be released to the lateral side.

One embodiment of a connection relationship between the heat shielding unit 400 and the shaft 300 is as follows.

Figure 5:
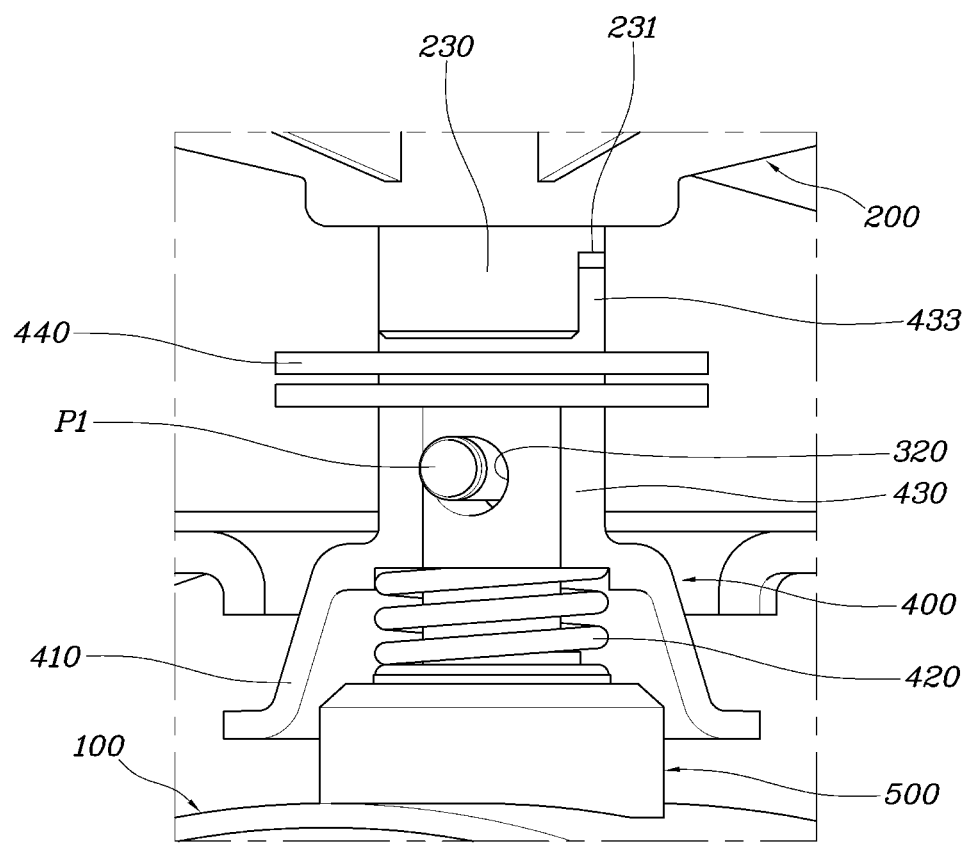
FIGS. 5 to 7 are views for explaining the variable exhaust valve assembly shown in FIG. 1.

As illustrated in FIGS. 4 and 5, the heat shielding unit 400 includes an elastic member 420 provided to be in contact with one end of the bearing member 500 inside the cover unit 410 and to press the bearing member 500 toward the through hole 110 side, and the shaft 300 is provided with a support protrusion 310 located at the other end of the bearing member 500 and protruding in the circumferential direction such that the bearing member 500 is seated on the support protrusion 310, so that the bearing member 500 can be restricted from moving toward the exhaust housing 100.

That is, since the exhaust housing 100 is provided with the through hole 110 through which the shaft 300 passes, the high-temperature heat of the exhaust gas is released through the through hole 110. However, as the bearing member 500 provided in the through hole 110 closes the through hole 110 while supporting the rotation of the shaft 300, the heat released through the through-hole 110 is reduced. Accordingly, the bearing member 500 should be fixed in the through hole 110.

For this purpose, since the elastic member 420 is provided inside the heat shielding unit 400 and the elastic member 420 applies an elastic force to press the bearing member 500 toward the through hole 110 side, the bearing member 500 is restricted from being separated to one side of the through hole 110. In addition, since the shaft 300 has the support protrusion 310 positioned at the other end of the bearing member 500 and the bearing member 500 is seated on the support protrusion 310, the bearing member 500 is restricted from being separated to the other side of the through hole 110.

Due to this, since the bearing member 500, which is provided in the through hole 110 and rotatably supports the shaft 300, is pressed against the support protrusion 310 by the elastic member 420 provided inside the cover member 410 of the heat shielding unit 400 in the state of being seated on the support protrusion 310 of the shaft 300, the bearing member 500 can be in close contact with the support protrusion 310 of the shaft 300 to be fixed in position and the heat released through the through hole 110 can be reduced.

Meanwhile, the power transmission device 200 is provided with a rotary shaft 230 configured to transmit rotational power, the heat shielding unit 400 is provided with a connection portion 430 extending from the cover unit 410 and coupled to the rotary shaft 230, and the connection portion 430 may be provided with a mounting groove 431, which is recessed such that the shaft 300 is inserted thereinto.

As shown in FIGS. 4 and 5, the heat shielding unit 400 is configured such that the rotary shaft 230 configured to transmit the rotational power of the power transmission device 200 is connected to one side of the heat shielding unit 400 and the shaft 300 is connected to the other side of the heat shielding unit 400. Thus, since the heat shielding unit 400 includes the connection portion 430 extending from the cover unit 410 to one side and coupled to the rotary shaft 230 in the axial direction and the mounting groove 431, which is recessed on the other side of the connection portion 430 such that the shaft 300 is inserted thereinto, the rotary shaft 230 and the shaft 300 are coupled to each other in the axial direction through the heat shielding unit 400.

In this way, since the rotary shaft 230 of the power transmission device 200 and the shaft 300 are connected to each other through the heat shielding unit 400 rather than being directly connected to each other as described above, the shaft 300 extending across the exhaust housing 100 can be prevented from receiving and directly transferring the high-temperature heat of the exhaust gas to the power transmission device 200 side through the rotary shaft 230. That is, since the rotary shaft 230 of the power transmission device 200 and the shaft 300 are axially coupled to one side and the other side of the heat shielding unit 400, respectively, the heat shielding unit 400 and the shaft 300 can be rotated together by the rotational power transmitted from the power transmission device 200 so as to adjust the opening degree of the valve 301, and the high-temperature heat transferred through the shaft 300 is restricted from being transferred to the power transmission device 200 side by the heat shielding unit 400. As a result, it is possible to prevent the power transmission device 200 from being damaged due to the high-temperature heat.

The connection between the rotary shaft 230 and the shaft 300 will be described in detail with reference to the above-described heat shielding unit 400. As illustrated in FIG. 5, the connection portion 430 of the heat shielding unit 400 is provided with a first opening hole 432, the shaft 300 is provided with a second opening hole 320 corresponding to the first opening hole 432 in the state in which the shaft 300 is inserted into the mounting groove 431 of the connection portion 430, and a fastening pin P1 is inserted into the first opening hole 432 and the second opening hole 320, so that the heat shielding unit 400 and the shaft 300 can be connected to each other.

Thus, the first opening hole 432 provided in the connection portion 430 of the heat shielding unit 400 and the second opening hole 320 provided in the shaft 300 may be located to be matched with each other in the state in which the shaft 300 is inserted into the mounting hole 400 of the heat shielding unit 400. In addition, when the fastening pin P1 is coupled through the first opening hole 432 and the second opening hole 320, the heat shielding unit 400 and the shaft 300 are connected to each other.

In addition, the first opening hole 432 may be formed to have a larger or smaller size than the second opening hole 320. Since the first opening hole 432 and the second opening hole 320 are formed to have different sizes, a gap in which the fastening pin P1 passing through the first opening hole 432 and the second opening hole 320 is movable is secured.

For example, when the size of the first opening hole 432 formed in the connection portion 430 of the heat shielding unit 400 is smaller than the size of the second opening hole 320 formed in the shaft 300, the heat shielding unit 400 and the fastening pin P1 are movable in the shaft 300. This allows assembly tolerance in the axial direction to be absorbed when assembling the rotary shaft 230 of the power transmission device 200, the heat shielding unit 400, and the shaft 300, thereby achieving a smooth assembly relationship.

Figure 6:
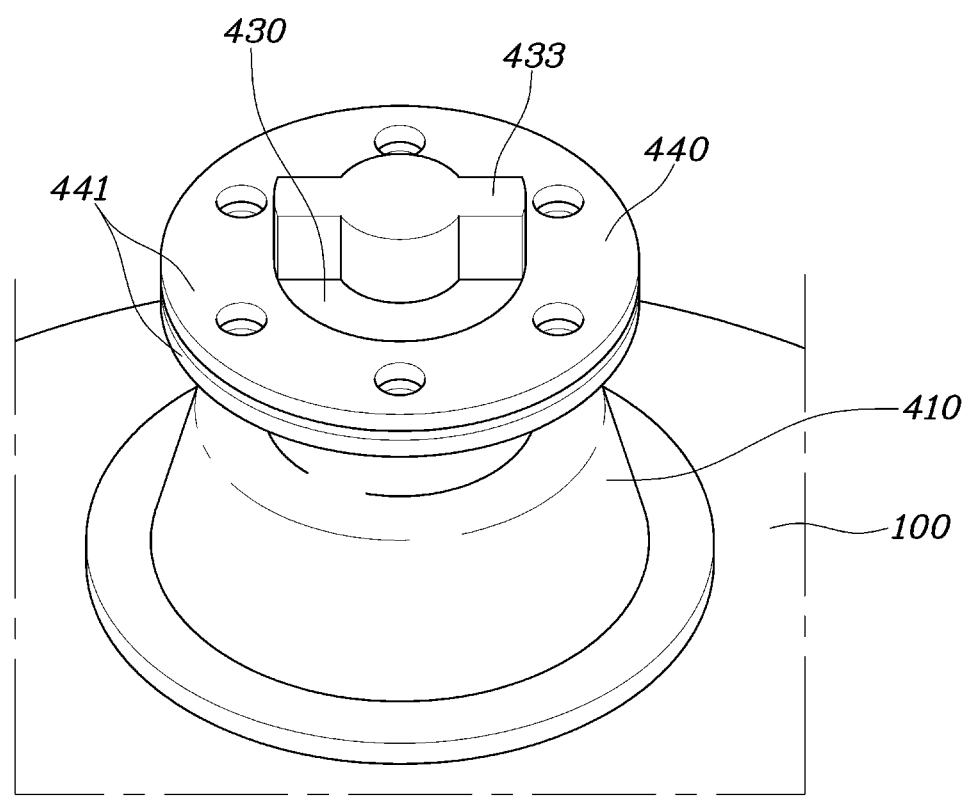
Figure 7:
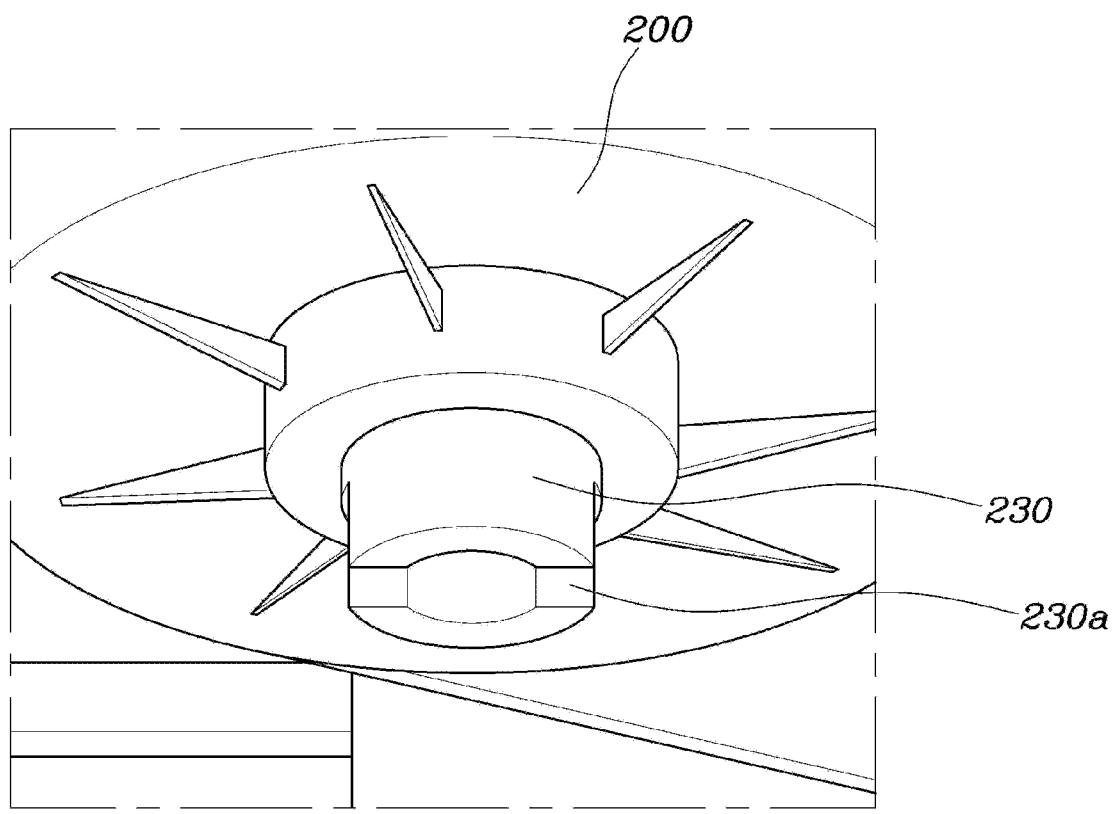

Meanwhile, as illustrated in FIGS. 6 and 7, the rotary shaft 230 may be provided with an insertion protrusion or an insertion groove 230a at an end corresponding to the connection portion 430, and the connection portion 430 may be provided with an insertion groove or an insertion protrusion 433, which is matched with the rotary shaft 230.

FIGS. 6 and 7 illustrate that the insertion groove 230a is provided in the rotary shaft 230 and the insertion protrusion 433 is provided in the connection portion 430 of the heat shielding unit 400. The insertion protrusion 433 of the heat shielding unit 400 may be inserted into the insertion groove 230a in the rotary shaft 230, so that the rotary shaft 230 and the heat shielding unit 400 can be rotated together by receiving the rotational power from the power transmission device 200.

For this purpose, the insertion groove 230a in the rotary shaft 230 has a shape elongated and recessed in a single slot form, and the insertion protrusion 433 of the heat shielding unit 400 may have the same shape as the insertion groove 230a, so that the heat shielding unit 400 can be rotated together with the rotary shaft 230 when the rotary shaft 230 is rotated in the state in which the insertion protrusion 433 is inserted into the insertion groove 230a.

Since the insertion protrusion 433 has the fastening structure inserted into the insertion groove 230a as described above, no additional fixing means is required, and the rotational power transmitted from the power transmission device 200 can be smoothly transmitted to the rotary shaft 230, the heat shielding unit 400, and the shaft 300.

Meanwhile, as shown in FIGS. 4 to 6, the heat shielding unit 400 may be provided with a heat insulating unit 440, which is installed in the connection portion 430 to be located between the power transmission device 200 and the cover unit 410 and is configured to dissipate and radiate heat transmitted through the exhaust housing 100 and the cover unit 410.

The heat insulating unit 440 is disposed between the exhaust housing 100 and the power transmission device 200 to block high-temperature heat from being transmitted to the power transmission device 200, and may include a plurality of heat sinks 441 as can be seen from FIG. 6. The heat insulating unit 440 may be mounted on and fixed to the connection portion 430 of the heat shielding unit 400 and may be formed to have an area such that high-temperature heat transmitted through the exhaust housing 100 can be primarily blocked by the heat shielding unit 400 and can be secondarily blocked by the heat insulating unit 400, thereby minimizing the high-temperature heat transferred to the power transmission device 200.

Meanwhile, as illustrated in FIG. 3, the power transmission device 200 may include a housing 210 having a motor unit 220 housed therein to generate rotational power, the rotary shaft 230 provided inside the housing 210 to transmit rotational power transmitted from the motor unit 220 to the shaft 300, and a vibration absorption unit 240 provided inside the housing 210 and configured to rotatably support the rotary shaft 230 from the housing 210 and to absorb vibration. Here, the housing 210 is further provided with a bracket B connected to the exhaust housing 100, so that the power transmission device 200 and the exhaust housing 100 can be fixed.

In this way, the motor unit 220 and the vibration absorption unit 240 are housed in the housing 210, and the rotary shaft 230 is connected to the motor unit 220 so as to receive rotational power. Particularly, since the rotary shaft 230 is seated on the vibration absorption unit 240 in the state of being connected to the motor unit 220, the vibration transmitted through the rotary shaft 230 can be attenuated, thereby preventing the motor unit 220 from being damaged by the vibration.

Here, the vibration absorption unit 240 may include a worm wheel unit 241 that is rotated by receiving rotational power from the motor unit 220 and a damper unit 242 that is seated on the worm wheel unit 241 and absorbs vibration. The rotary shaft 230 may include a shaft portion 231 that penetrates the worm wheel unit 241 and transmits rotational power to the shaft 300 and a support portion 232 that protrudes from the shaft portion 231 to be mounted on the worm wheel unit 241 and to be seated on the damper unit 242.

As can be seen from FIG. 3, the vibration absorption unit 240 includes the worm wheel unit 241 and the damper unit 242, in which the worm wheel unit 241 is rotated within the housing 210 by receiving rotational power from the motor unit 220. Here, a screw, which is rotated by rotational power, extends from the motor unit 220 and the worm wheel unit 241 includes a gear formed on the outer peripheral surface thereof to be engaged with the screw so as to receive rotational power, so that the rotational power of the motor unit 220 can be transmitted to the worm wheel unit 241 through the screw and the worm wheel portion 241 can be rotated.

The worm wheel unit 241 is provided with the damper unit 242 and the damper unit 242 is made of a rubber material so as to absorb vibration, so that vibration transmitted from the rotary shaft 230 can be attenuated. Here, the rotary shaft 230 includes the shaft portion 231 which penetrates the worm wheel unit 241 and is connected to the shaft 300 and the support portion 232 which protrudes from the shaft portion 231 to be mounted on the worm wheel unit 241. That is, the support portion 232 of the rotary shaft 230 is mounted on the worm wheel unit 241 and is rotated together with the worm wheel portion 241. Since the support portion 232 of the rotary shaft 230 is seated on the damper unit 242 while being mounted on the worm wheel unit 241, the vibration generated from the shaft 300 is prevented from being transmitted to the motor unit 220 through the rotary shaft 230.

Due to this, the power transmission device 200 is capable of transmitting rotational power generated in the motor unit 220 to the worm wheel unit 241 constituting the vibration absorption unit 240, and the rotary shaft 230, the heat shielding unit 400, and the shaft 300 are capable of being rotated together with the worm wheel unit 241, thereby adjusting the opening degree of the valve 301. Particularly, since the rotary shaft 230 is seated on the damper unit 242 provided on the worm wheel unit 241, the vibration transmitted through the rotary shaft 230 is capable of being attenuated by the damper unit 242, so that vibration transmitted to the motor unit 220 can be minimized.

The variable exhaust valve assembly of the vehicle having the above-described structure minimizes damage to the power transmission device 200 for regulating the opening degree of the valve, which is caused by high-temperature heat of exhaust gas, and reduces vibration, which is transmitted to the power transmission device 200, thereby improving the durability of the power transmission device 200.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined by the accompanying claims.

What is claimed is:

1. A variable exhaust valve assembly for a vehicle, comprising:
    an exhaust housing through which exhaust gas flows;
    a power transmission device disposed apart from the exhaust housing and configured to transmit rotational power;
    a shaft configured to receive the rotational power from the power transmission device, extending through and across the exhaust housing, and coupled with a valve provided inside the exhaust housing so as to open and close the exhaust housing according to a rotational position thereof; and
    a heat shielding unit mounted on the shaft between the power transmission device and the exhaust housing and configured to block heat transfer so as to reduce heat transfer between the power transmission device and the exhaust housing,
    wherein the exhaust housing is provided with a through hole through which the shaft passes,
    wherein the heat shielding unit has a cover unit formed to cover a peripheral portion of the through hole in the exhaust housing in a state of being mounted on the shaft,
    wherein the power transmission device is provided with a rotary shaft configured to transmit rotational power,
    wherein the heat shielding unit is provided with a connection portion that extends from the cover unit and is coupled to the rotary shaft, and the connection portion is provided with a mounting groove, which is recessed such that the shaft is inserted thereinto,
    wherein the connection portion of the heat shielding unit is provided with a first opening hole,
    wherein the shaft is provided with a second opening hole that corresponds to the first opening hole in a state where the shaft is inserted into the mounting groove in the connection portion, and
    wherein a fastening pin is inserted into the first opening hole and the second opening hole such that the heat shielding unit and the shaft are connected to each other.

2. The variable exhaust valve assembly of claim 1, further comprising:
    a bearing member provided to close the through hole and configured to wrap the shaft so as to support rotary motion of the shaft.

3. The variable exhaust valve assembly of claim 2, wherein the heat shielding unit includes an elastic member provided to be in contact with one end of the bearing member inside the cover unit and configured to press the bearing member toward the through hole, and
    wherein the shaft is provided with a support protrusion which is located at a remaining end of the bearing member and protrudes in a circumferential direction such that the bearing member is seated on the support protrusion to be restricted from moving toward the exhaust housing.

4. The variable exhaust valve assembly of claim 1, wherein the first opening hole is formed to have a larger or smaller size than the second opening hole.

5. The variable exhaust valve assembly of claim 1, wherein the heat shielding unit is provided with a heat insulating unit, which is installed in the connection portion to be located between the power transmission device and the cover unit and is configured to dissipate and radiate heat transmitted through the exhaust housing and the cover unit.

6. The variable exhaust valve assembly of claim 1, wherein the rotary shaft is provided with or an insertion groove at an end portion corresponding to the connection portion, and
    wherein the connection portion is provided with an insertion protrusion, which is matched with the rotary shaft.

7. The variable exhaust valve assembly of claim 1, wherein the power transmission device includes:
    a housing in which a motor unit configured to generate rotational power is housed;
    a rotary shaft provided inside the housing and configured to transmit the rotational power transmitted from the motor unit to the shaft; and
    a vibration absorption unit provided inside the housing and configured to rotationally support the rotary shaft from the housing and to absorb vibration.

8. The variable exhaust valve assembly of claim 7, wherein the vibration absorption unit includes a worm wheel unit that is rotated by receiving rotational power from the motor unit, and a damper unit that is seated on the worm wheel unit and absorbs vibration, and
    wherein the rotary shaft includes a shaft portion that penetrates the worm wheel unit and is configured to transmit rotational power to the shaft, and a support portion that protrudes from the shaft portion to be mounted on the worm wheel unit and to be seated on the damper unit.

* * * * *